UNITED STATES PATENT OFFICE.

WILLIAM H. DANIELS, OF CHICAGO, ILLINOIS.

COMPOSITION FOR PRESERVING FOOD.

SPECIFICATION forming part of Letters Patent No. 386,386, dated July 17, 1888.

Application filed June 2, 1888. Serial No. 275,836. (No specimens.)

*To all whom it may concern:*

Be it known that I, WILLIAM H. DANIELS, of Chicago, in the county of Cook and State of Illinois, have invented certain new and useful Improvements in Antiseptic Compounds; and I do hereby declare that the following is a full, clear, and exact description of the invention, which will enable others skilled in the art to which it appertains to make and use the same.

This composition or compound belongs to that class which are vaporized when used, the articles of food or other material which is to be preserved being subjected within a closed vessel to the action of the vapors or fumes; and it consists in a compound or composition in the nature of a powder, which is composed of the following ingredients, combined in about the proportions stated, to wit: sulphur, one pound; sugar, four ounces; sassafras, four ounces; cinnamon, two ounces; nitrate of potassium, two ounces. These several ingredients are reduced by grinding or other suitable means to a powder, and then thoroughly mixed to form a homogeneous mass, which is packed in boxes or canisters of suitable size and weight, and in this condition it is placed upon the market for sale.

In using my antiseptic compound, the substances to be preserved are inclosed within an air-tight vessel or receptacle, together with a suitable quantity of the composition, which is vaporized by means of any suitable apparatus. The substance or material treated should be submitted to the action of the vapors or fumes of the composition until they have been thoroughly impregnated, the time for the exposure depending upon the nature of the material treated, as well as its size. After the material which is to be preserved has been treated in this manner for a sufficient length of time to insure perfect impregnation, it is removed from the inclosing-vessel, and may then be subjected to atmospheric or other influences without danger of decomposition or deterioration.

By the use of this composition and its application in the manner described, the food and food products or other substance treated are in no wise deteriorated in quality or noxiously affected, the vapor being in itself innocuous but thoroughly antiseptic in character, whereby it enables substances exposed to its action in the manner described to retain all their natural qualities for an indefinite period.

Among the numerous purposes to which the use of this compound is adapted may be mentioned the preservation of fish, meats, vegetables, and other food products, either in a raw or cooked state; the embalming and preservation of human and other bodies; the preservation of natural history and medical specimens, &c.

I am well aware that one or more of the ingredients herein named have before been used for the same purpose; but I am not aware that all the ingredients of my compound have been used together in the proportions and in the manner in which I use them.

What I claim as new, therefore, and desire to secure by Letters Patent of the United States, is—

The hereinbefore-described antiseptic compound or composition adapted to be used for the preservation of perishable articles in the manner described, said compound or composition consisting of sulphur, sugar, sassafras, cinnamon, and nitrate of potassium, mixed in about the proportions set forth.

In testimony that I claim the foregoing as my own I have hereunto affixed my signature in presence of two witnesses.

WILLIAM H. DANIELS.

Witnesses:
 AUGUST PETERSON,
 BENNETT S. JONES.